(12) United States Patent
Johas Teener

(10) Patent No.: US 6,636,914 B1
(45) Date of Patent: Oct. 21, 2003

(54) METHOD AND APPARATUS FOR ARBITRATION AND FAIRNESS ON A FULL-DUPLEX BUS USING DUAL PHASES

(75) Inventor: Michael D. Johas Teener, Santa Cruz, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/435,134

(22) Filed: Nov. 5, 1999

(51) Int. Cl.[7] .......................... G06F 12/00; G06F 13/14
(52) U.S. Cl. ...................... 710/240; 710/113; 710/119
(58) Field of Search .................. 710/107–119, 240–244

(56) References Cited

U.S. PATENT DOCUMENTS

| | | | |
|---|---|---|---|
| 4,156,798 A | 5/1979 | Doelz ..................... 179/15 AL |
| 4,194,113 A | 3/1980 | Fulks et al. .................... 371/20 |
| 5,014,262 A | 5/1991 | Harshavardhar ............. 370/16 |
| 5,274,631 A | 12/1993 | Bhardwaj ..................... 370/60 |
| 5,343,461 A | 8/1994 | Barton et al. ................. 370/13 |
| 5,394,556 A | 2/1995 | Oprescu ..................... 395/800 |
| 5,452,330 A | * 9/1995 | Goldstein ............... 370/395.1 |
| 5,490,253 A | * 2/1996 | Laha et al. ..................... 710/1 |
| 5,495,481 A | 2/1996 | Duckwall .................. 370/85.2 |
| 5,539,390 A | 7/1996 | Nagano et al. ........ 340/825.07 |
| 5,541,670 A | 7/1996 | Hanai ......................... 348/705 |
| 5,568,641 A | 10/1996 | Nelson ....................... 395/700 |
| 5,583,922 A | 12/1996 | Davis et al. ................... 379/96 |
| 5,621,659 A | 4/1997 | Matsumoto et al. .... 364/514 R |
| 5,630,173 A | 5/1997 | Oprescu ..................... 395/860 |
| 5,640,595 A | 6/1997 | Baugher et al. ............. 395/830 |
| 5,684,715 A | 11/1997 | Palmer ....................... 365/514 |
| 5,701,476 A | 12/1997 | Fenger ....................... 395/652 |
| 5,701,492 A | 12/1997 | Wadsworth et al. ........ 395/712 |
| 5,712,834 A | 1/1998 | Nagano et al. ............... 369/19 |
| 5,719,862 A | 2/1998 | Lee et al. ................... 370/355 |
| 5,784,648 A | * 7/1998 | Duckwall ................... 710/120 |
| 5,802,048 A | 9/1998 | Duckwall ................... 370/389 |
| 5,802,057 A | * 9/1998 | Duckwall et al. ........... 370/408 |
| 5,805,073 A | 9/1998 | Nagano et al. ........ 340/825.07 |
| 5,809,331 A | 9/1998 | Staats et al. ................ 395/830 |
| 5,832,298 A | 11/1998 | Sanchez et al. ............. 395/828 |
| 5,835,761 A | 11/1998 | Ishii et al. .................. 395/653 |
| 5,867,730 A | 2/1999 | Leyda ........................ 395/830 |
| 5,875,301 A | 2/1999 | Duckwall et al. ....... 395/200.51 |

(List continued on next page.)

OTHER PUBLICATIONS

"IEEE Standard for a High Performance Serial Bus", IEEE Standard 1394–1995, Institute of Electrical and Electronics Engineers, Inc., Aug. 30, 1996.

"IEEE Standard for a High Performance Serial Bus–Amendment 1", Institute of Electrical and Electronics Engineers, Inc., pp. 1–196, 2000 (no month).

P1394b IEEE Draft Standard for a High Performance Serial Bus (High Speed Supplement), Institute of Electrical and Electronics Engineers, Inc., pp. 1–408, 2002 (no month).

"AV/C Digital Interface Command Set General Specification, Rev. 3.0", 1394 Trade Association, pp. 4–5, 20–34, Apr. 15, 1998.

"Enhancements to the AV/C General Specification 3.0 Version 1.0FC1", 1394 Trade Association, pp. 4, 6–17, Nov. 5, 1998.

"Fibre Channel–Methodologies for Jitter Specification", NCITS TR–25–1999, Jitter Working Group Technical Report, Rev. 10, pp. 1–96, Jun. 9, 1999.

*Primary Examiner*—Rupal Dharia
(74) *Attorney, Agent, or Firm*—Sierra Patent Group, Ltd.

(57) ABSTRACT

A method and apparatus for arbitrating on a high performance serial bus is disclosed. The invention provides for a plurality of arbitration phases and an arbitration advancing means.

36 Claims, 14 Drawing Sheets

Asynchronous Arbitration
According to the Present Invention

U.S. PATENT DOCUMENTS

| | | | |
|---|---|---|---|
| 5,938,764 A | 8/1999 | Klein | 713/1 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 6,032,202 A | 2/2000 | Lea et al. | 710/8 |
| 6,038,625 A | 3/2000 | Ogino et al. | 710/104 |
| 6,070,187 A | 5/2000 | Subramaniam et al. | 709/220 |
| 6,073,206 A | 6/2000 | Piwonka et al. | 711/102 |
| 6,122,248 A | 9/2000 | Murakoshi et al. | 370/216 |
| 6,131,129 A | 10/2000 | Ludtke | 710/5 |
| 6,133,938 A | 10/2000 | James | 348/8 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,157,972 A * | 12/2000 | Newman et al. | 370/912 |
| 6,160,796 A | 12/2000 | Zou | 370/257 |
| 6,167,532 A | 12/2000 | Wiseccup | 713/300 |
| 6,173,327 B1 | 1/2001 | De Borst et al. | 709/231 |
| 6,192,189 B1 | 2/2001 | Fujinami et al. | 386/96 |
| 6,202,210 B1 | 3/2001 | Ludtke | 725/20 |
| 6,233,615 B1 | 5/2001 | Van Loo | 709/224 |
| 6,233,624 B1 | 5/2001 | Hyder et al. | 709/327 |
| 6,247,083 B1 | 6/2001 | Hake et al. | 710/107 |
| 6,253,114 B1 | 6/2001 | Takihara | 700/83 |
| 6,253,255 B1 | 6/2001 | Hyder et al. | 709/321 |
| 6,260,063 B1 | 7/2001 | Ludtke et al. | 709/224 |
| 6,266,334 B1 | 7/2001 | Duckwall | 370/397 |
| 6,266,701 B1 | 7/2001 | Sridhar et al. | 709/232 |
| 6,282,597 B1 | 8/2001 | Kawamura | 710/105 |
| 6,295,479 B1 | 9/2001 | Shima et al. | 700/83 |
| 6,308,222 B1 | 10/2001 | Krueger et al. | 709/247 |
| 6,311,228 B1 | 10/2001 | Ray | 709/301 |
| 6,345,315 B1 | 2/2002 | Mishra | 709/329 |
| 6,353,868 B1 | 3/2002 | Takayama et al. | 710/129 |
| 6,385,679 B1 * | 5/2002 | Duckwall et al. | 710/100 |

* cited by examiner

IEEE-1394 Data Stream During Arbitration

IEEE-1394 Tree Structure

IEEE-1394 Communication Between Nodes Requesting Arbitration

IEEE-1394 Communication Between Nodes Requesting Arbitration

IEEE-1394 Communication Between Nodes Requesting Arbitration

IEEE-1394 Communication Between Nodes
Requesting Arbitration

IEEE-1394 Arbitration Fairness

Arbitration According to P1394b

Fairness Protocol According to P1394b

Node Behavior
(Prior Art)

Asynchronous Arbitration
According to the Present Invention

Asynchronous Fairness
According to the Present Invention

Asynchronous Fairness
According to the Present Invention

Isochronous Arbitration
According to the Present Invention ically equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394 connections on equipment that they sell.

METHOD AND APPARATUS FOR ARBITRATION AND FAIRNESS ON A FULL-DUPLEX BUS USING DUAL PHASES

BACKGROUND OF THE INVENTION

1. Field of the Invention

The present invention relates to bus management. In particular, the present invention relates to an arbitration and fairness protocol on a serial bus system.

2. The Prior Art

Background

Modern electronic equipment has greatly enhanced the quality of our lives. However, as the use of such equipment has increased, so has the need to connect equipment purchased from different manufacturers. For example, while a computer and a digital camera may each be useful when used alone, the ability to connect the digital camera to the computer and exchange information between the two makes the combination even more useful. Therefore, a need was apparent for a serial bus standard that would allow for the connection and communication between such devices.

The IEEE 1394-1995 standard was developed to satisfy this need. This standard revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394 connections on equipment that they sell.

However, as technologies improved, the need to update the IEEE 1394 standard became apparent. Two new standards are being proposed at the time of the filing of this application, herein referred to as the proposed IEEE 1394a, or P1394a standard, and the proposed IEEE 1394b, or P1394b standard. Improvements such as higher speeds and longer connection paths will be provided.

Arbitration in IEEE 1394-1995

One area that has been improved is in the way that bus arbitration takes place on the bus. Arbitration is the process by which a device desiring to send data over the bus gains control of the bus in order to transfer the data.

FIG. 1 shows a prior art example of a typical data stream 100 during arbitration on a IEEE 1394-1995 compliant bus. In FIG. 1, data flow is generally from left to right on the page.

According to the IEEE 1394-1995 standard, the bus is required to remain idle for some predetermined time prior to arbitration. This period is known as either the arbitration reset gap or the subaction gap, as represented by packet 102. After this gap 102, an arbitration request 104 ("arb") may be sent by the device wishing to send data over the bus. If arbitration is granted, then data packet 10 may be sent. After some idle time represented by packet 108, an acknowledgment packet 110 ("ack") is sent by the receiving device, and the bus is returned to idle in packet 112.

FIG. 2 shows an example of prior art tree and root arrangement of node on an IEEE 1394-1995 compliant bus. As is appreciated by one skilled in the art, on a bus compliant with the IEEE 1394-1995 standard, when devices are connected together, a Tree-ID process takes place that results in one node being designated as the root, and all others being designated as branch and leaf nodes developing from the root node. Accordingly, in FIG. 2, node #4 has been designated the root node, and nodes #0, #1 and #2 are leaf nodes, and node #3 is a branch node. As is known by one skilled in the art, nodes #1 and #2 are referred to as "child" nodes of the "parent" node #3, and nodes #0 and #3 are referred to as the "child" nodes of the "parent" node #4.

FIGS. 3A through 3D shows a prior art example of how the packets shown in FIG. 1 might propagate in the tree arrangement shown in FIG. 2 during a request for arbitration. FIG. 3A shows nodes #1 and #2 requesting arbitration at the same time. As is known by one skilled in the art, nodes along the path to the root arbitrate with their respective parents, while the root node makes the final decision. Therefore, a parent node will pass along a request to its parent, while denying access to its other children. Accordingly, FIG. 3B shows node #3 passing along node #2's request to the root node #4, while node #3 denies access to its other child node #1. Likewise, root node #4 has received node #0's request, and denies access to node #3.

In FIG. 3C, root node #4 will acknowledge node #0's first-received request by sending a grant to node #0. Node #0 will then withdraw its request.

In FIG. 3D, nodes #2 and #3 will withdraw their requests, having both received denies. Thus, node #0 has now won arbitration, and may begin sending data over the bus.

As is appreciated by one skilled in the art, the process shown in FIGS. 3A–3D has certain drawbacks. First, since in the IEEE 1394-1995 standard packet transmission between nodes is not full duplex (unlike arbitration signals, which are full duplex), packet transmission between nodes may only occur in one direction at a time. This limitation results in the fact that arbitration requests may not be communicated while data packets are being transmitted.

More importantly for the purposes of the present invention, the process shown in FIGS. 3A–3D demonstrates that for node #2 to arbitrate for control of the bus, its request must be routed through node #3 to be decided by root node #4 and travel back down again to be received. Furthermore, as mentioned above, the arbitration process as carried out in the IEEE 1394-1995 standard requires that some period of idle bus (either an arbitration reset or subaction gap) occur before arbitration can begin again. As is appreciated by one skilled in the art, the larger the tree grows, the longer the path the farthest leaf node's request must travel, and the slower the entire process gets. Finally, while an arbitration reset or subaction gap is occurring, no data may be sent, resulting in inefficiencies.

Fairness in IEEE 1394-1995

The IEEE 1394-1995 standard also includes a concept known as fairness. Fairness is a procedure whereby all nodes that wish to gain control of the bus get at least one shot to arbitrate within a given period.

FIG. 4 shows an example of the prior art fairness procedure. In FIG. 4, nodes A, B, and C all wish to arbitrate within time period 400. This time period is known as a fairness interval. For each node A, B, and C, a waveform representing the node's respective arbitration_enable flag is shown along a time axis. As is known by one skilled in the art, in order for an arbitration fairness period to begin, the bus must be idle for an arbitration reset gap. On FIG. 4, this period is show between time marker 402 and time marker 404.

As is known by one skilled in the art, after the arbitration reset gap is over, the arbitration_enable flag is set for nodes A, B, and C at time marker 404. This is indicated in FIG. 4 by the waveforms labeled node A, B, and C each going high at time marker 404. According to the IEEE 1394-1995 standard, a node's arbitration_enable flag will remain high until the node has won arbitration of the bus, then the arbitration enable flag will be reset low.

This process is shown in FIG. 4 first with node A. At time marker 404, node A begins to arbitrate, and at time marker 406, node A wins arbitration. Accordingly, node A's arbitration_enable flag is reset low, and node A is allowed to transmit data on the bus. When node A has finished transmitting, the bus goes idle at time maker 408 and after a shorter period of idle (the subaction gap) all nodes with their arbitration_enable flag set are permitted to arbitrate for the bus at time marker 410. In the case illustrated, node B wins arbitration at time marker 412, has its arbitration_enable flag reset low, and By transmits data. Finally, the bus goes idle for a subaction gap once again, and since no other node is arbitrating, node C wins arbitration at time marker 414, has its arbitration_enable flag set low, and transmits data until time marker 416.

Referring still to FIG. 4, after node C is done transmitting data at time marker 416, the bus stays idle for another arbitration reset gap between time markers 416 and 418 because none of the nodes A, B or C are allowed to arbitrate since all their arbitration_enable flags are reset. Once the arbitration reset gap has occurred at time marker 418, the arbitration_enable flags of all nodes are set, and they can once again arbitrate for control of the bus.

As is appreciated by one skilled in the art, the arbitration fairness procedure shown in FIG. 4 ensures that all nodes which wish control of the bus are queued up and taken in an orderly fashion.

The arbitration process and fairness procedure described above are satisfactory so long as the round trip time it takes to send and receive the arbitration request packet is relatively small compared to the length of the packet itself. As is known by one skilled in the art, this is usually the case in an IEEE 1394-1995 compliant bus.

However, the P1394b standard presents improvements that will reveal limitations in the arbitration process just described. For example, the P1394b standard is much faster and capable of much longer runs. As speeds increase, the present need for subaction and arbitration reset gaps make the current standard inefficient.

Prior Art Proposed Arbitration Protocol for P1394b

A new way of arbitrating was introduced into the P1394b standard that allowed arbitration to take place in parallel with data transmission, thus taking advantage of P1394b's full-duplex capabilities.

FIG. 5 shows an example of this process. As is known by one skilled in the art, one major innovation in P1394b was the elimination of the fixed bus master at the root node. Instead, in P1394b, the bus master is located at the node that last transmitted; in other words, the bus master node 'floats' in P1394b. Thus, in FIG. 5, since node #0 is transmitting data, node #0 is the bus master. In P1394b, the current bus master is known as the Bus Owner/Supervisor/Selector, or the BOSS, and makes the final arbitration decision.

In general, there is no reverse path to an arbitrary node. However, since the BOSS node is transmitting, it is the one node has a free return path from all other nodes. To take advantage of this free path arbitration requests are routed back to the BOSS node in P1394b.

Therefore, in FIG. 5 while data is being transmitted outward from the BOSS node, requests are being streamed inward to the BOSS node. As is appreciated by one skilled in the art, this will result in an improvement in efficiency when compared to the original 1394-1995 standard since the BOSS node will be able to determine which direction to send a grant while it is still sending data, and can send the grant immediately after it is completed sending.

Prior Art Proposed Fairness Protocol for P1394b

Additionally, a new fairness protocol has been proposed. The proposal includes a provision for requesting nodes to issue either a 'current' or 'next' request, depending on the node's status.

FIG. 6 shows the proposed fairness protocol as a flow chart.

The process starts with each requesting node sending an arbitration request. However, two types of requests are now permitted. In FIG. 6, query 600 asks whether the requesting node's arbitration_enable bit is set. If it is, then the node can send out a Current request as shown in act 602. If the requesting node's bit is not set, then the node must send out a Next request as shown in act 604.

Referring still to the protocol of FIG. 6, Current requests have priority over Next requests. Therefore, in act 606, the BOSS node will first service all of the Current requests that have worked their way up the tree (all intermediate nodes only pass on the highest request, so that a Next request will only be forwarded if there are no Current requests). When all of the Current requests have been drained, then the BOSS node will issue an arbitration reset in act 608. At this point, an arbitration timer is set in act 610. This timer is needed to prevent a race condition, as will be explained shortly.

After an arbitration reset is sent down the tree, all Next requests are renamed to Current requests in act 612. In P1394b, this may be performed on the fly locally at each node.

Referring still to FIG. 6, the BOSS will now begin to service the renamed Current requests that will appear in act 614. At this point, the function of the timer becomes important. As mentioned in act 612 above, the renaming of Next requests to Current requests occurs on the fly. This process may lead to a race condition, where nodes that are close to the BOSS node are renamed and serviced quickly, while nodes much farther down the tree may not have seen the arbitration reset from the BOSS yet, and therefore have not had their Next requests renamed to Current requests yet. To prevent the situation where a BOSS node re-issues another arbitration reset before a distant node has been serviced from occurring, the timer in act 610 is set to wait for a predetermined time to allow distant nodes to "catch up". This predetermined time is set to either be the worst case round trip time based upon the tree structure, or the time is set by the structure performing a self-test to determine the actual round trip time through the tree. The latter method has been implemented in the P1394a standard.

Referring still to FIG. 6, in act 614, the BOSS node now waits for the pre-determined amount of time set in act 610 to expire. Once that happens, the BOSS may issue another arbitration reset in act 616.

As is appreciated by one skilled in the art, the renaming of requests is not good practice since it is possible for requests to be in transit (actually on the wire and not stored in a node) and various other timeouts need to be added to handle these requests.

Hence, there is a need for an arbitration and fairness protocol for a full-duplex bus that eliminates the requirement for these extra timeouts and the need for the renaming of arbitration requests.

BRIEF DESCRIPTION OF THE INVENTION

The invention satisfies the above needs. The present invention relates to bus management. In particular, the present invention relates to an arbitration and fairness protocol on a serial bus system.

One preferred embodiment includes the acts of: providing a first arbitration phase, a second arbitration phase, and an arbitration advancing means; sending an arbitration reset command for the first arbitration phase by the BOSS node; granting arbitration by the BOSS node of arbitration requests made by the plurality of nodes for the first arbitration phase during the second arbitration phase; granting arbitration by the BOSS node of arbitration requests made by the plurality of nodes for the first arbitration phase during the first arbitration phase; advancing to the second arbitration phase according to the advancing means; sending an arbitration reset command for the second arbitration phase by the BOSS node; granting arbitration by the BOSS node of arbitration requests made by the plurality of nodes for the second arbitration phase during the first arbitration phase; and granting arbitration by the BOSS node of arbitration requests made by the plurality of nodes for the second arbitration phase during the second arbitration phase.

Another embodiment is disclosed, which includes the following acts: providing a current arbitration phase and an inactive arbitration phase, determining whether one of the plurality of nodes wishes to arbitrate on the full-duplex communications system; if one of the nodes wishes to arbitrate, determining further whether the arbitration indicator within the node is set; sending an arbitration request on the full-duplex communications system for the active arbitration phase by the node if the arbitration indicator is set; sending an arbitration request on the full-duplex communications system for the inactive arbitration phase by the node if the arbitration indicator is reset; and sending an arbitration denial for the current arbitration phase if the node does not wish to arbitrate.

Another embodiment is disclosed, which includes the acts of: providing a current arbitration phase and an inactive arbitration phase; determining whether one of the plurality of nodes wishes to arbitrate on the full-duplex communications system; if one of the nodes wishes to arbitrate, sending an arbitration request on the full-duplex communications system for the active arbitration phase by the node if the arbitration indicator is set; and sending an arbitration denial request on the full-duplex communications system for the current arbitration phase if the node does not wish to arbitrate.

Another method is disclosed that operates when communication on the bus occurs in both an asynchronous and isochronous comprising the acts of: servicing isochronous arbitration requests first; and servicing asynchronous arbitration requests second.

A machine readable medium containing a data structure for arbitrating on a high performance serial bus is disclosed, which comprises an arbitration phase indicator having an indication therein for indicating a plurality of arbitration phases.

A machine readable medium containing a data structure for providing access to arbitration on a high performance serial bus is disclosed, which comprises an arbitration phase indicator having an indication therein for indicating a desire to arbitrate within one of a plurality of arbitration phases.

A machine readable data transmission containing a data structure for arbitrating on a high performance serial bus is disclosed, which comprises a portion therein for indicating a plurality of arbitration phases.

A machine readable data transmission containing a data structure for providing access to arbitration on a high performance serial bus, which comprises a portion therein for indicating a desire to arbitrate within one of a plurality of arbitration phases.

BRIEF DESCRIPTION OF THE DRAWING FIGURES

DETAILED DESCRIPTION OF PREFERRED EMBODIMENTS

Figure 1:
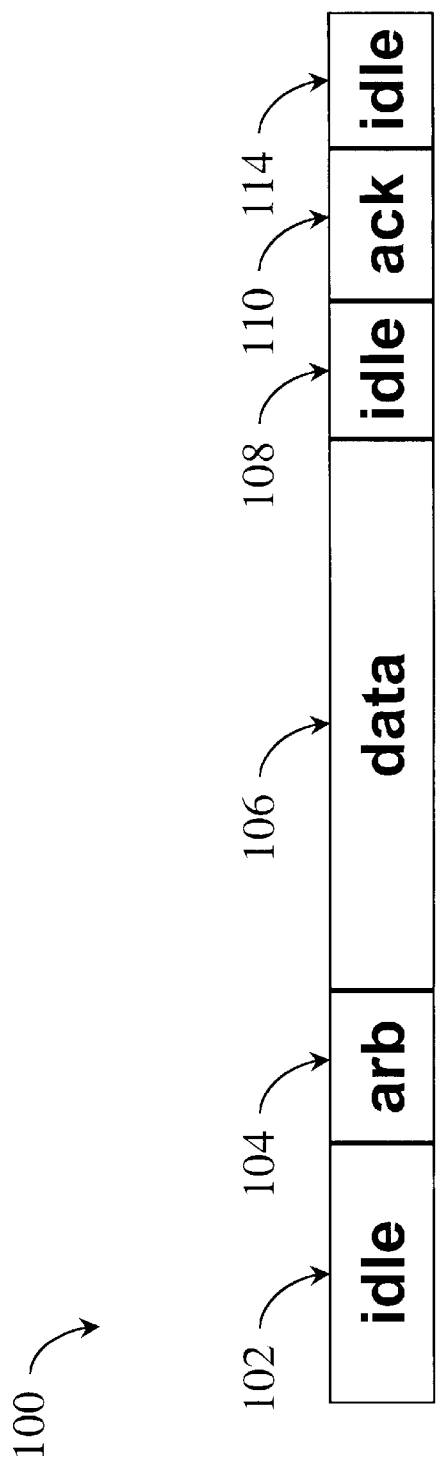
FIG. 1 is a prior art example of an IEEE 1394-1995 data stream during arbitration.
Figure 2:
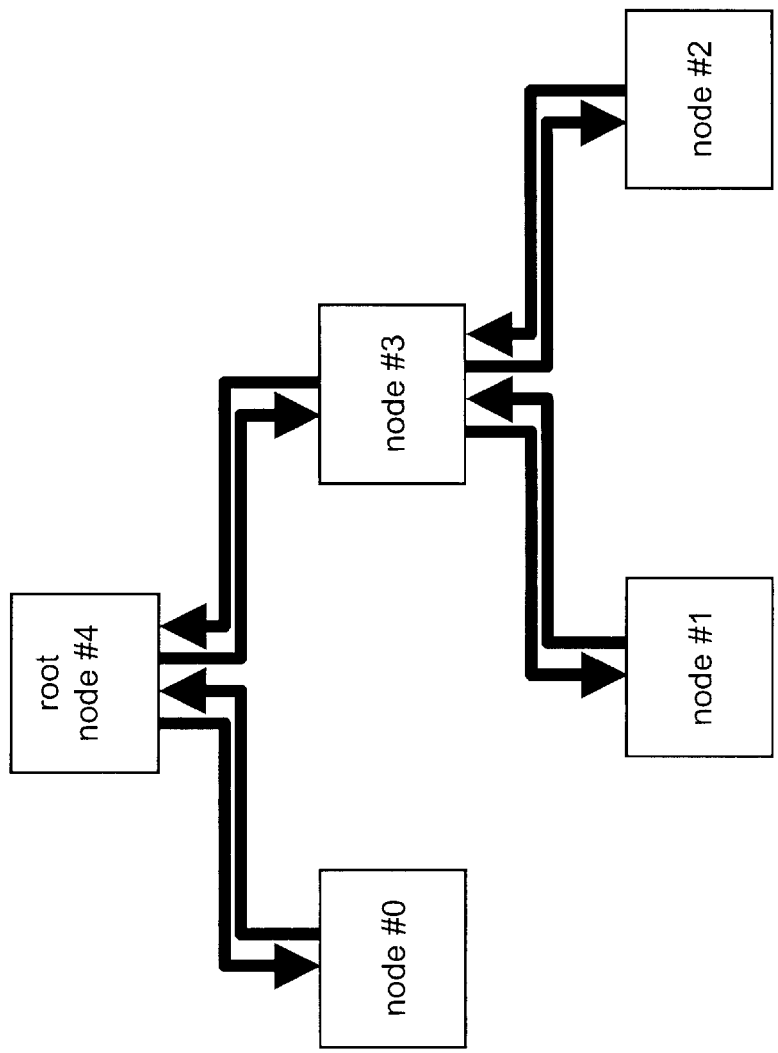
FIG. 2 is a prior art example of IEEE 1394-1995 tree structure.
Figure 3A:
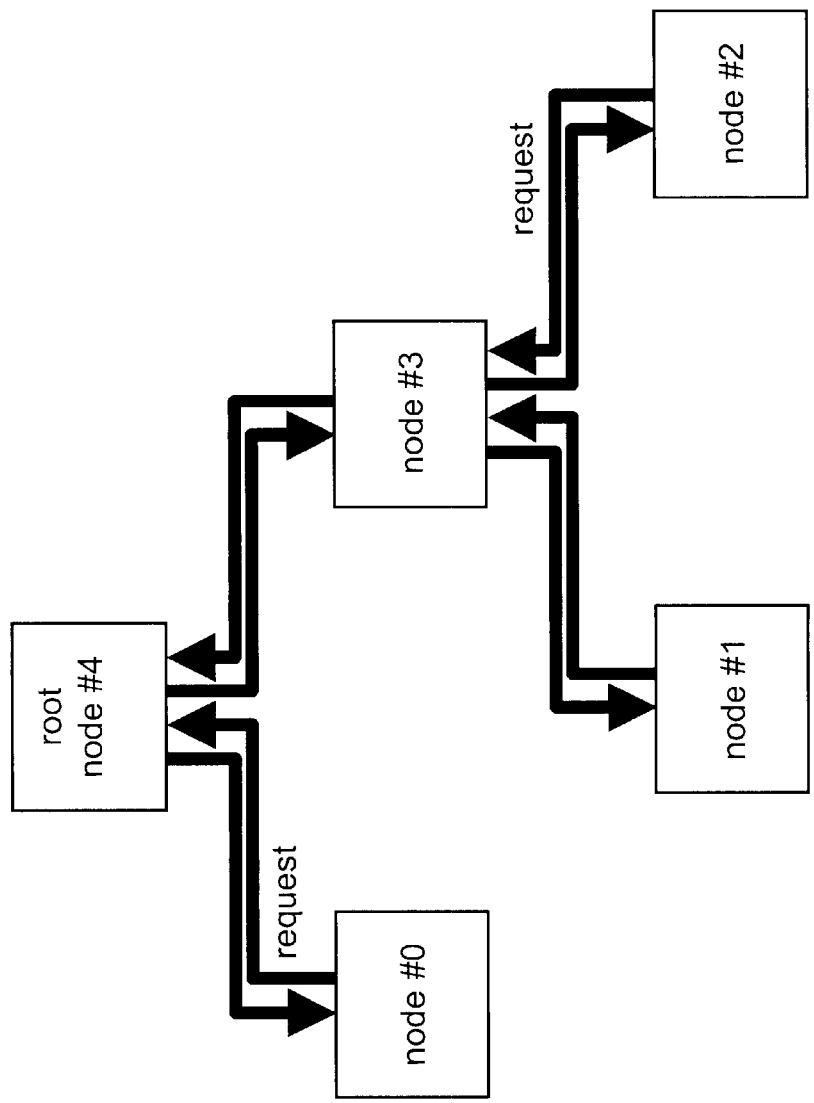
FIG. 3A is a prior art example of IEEE 1394-1995 communication between nodes during arbitration.
Figure 3B:
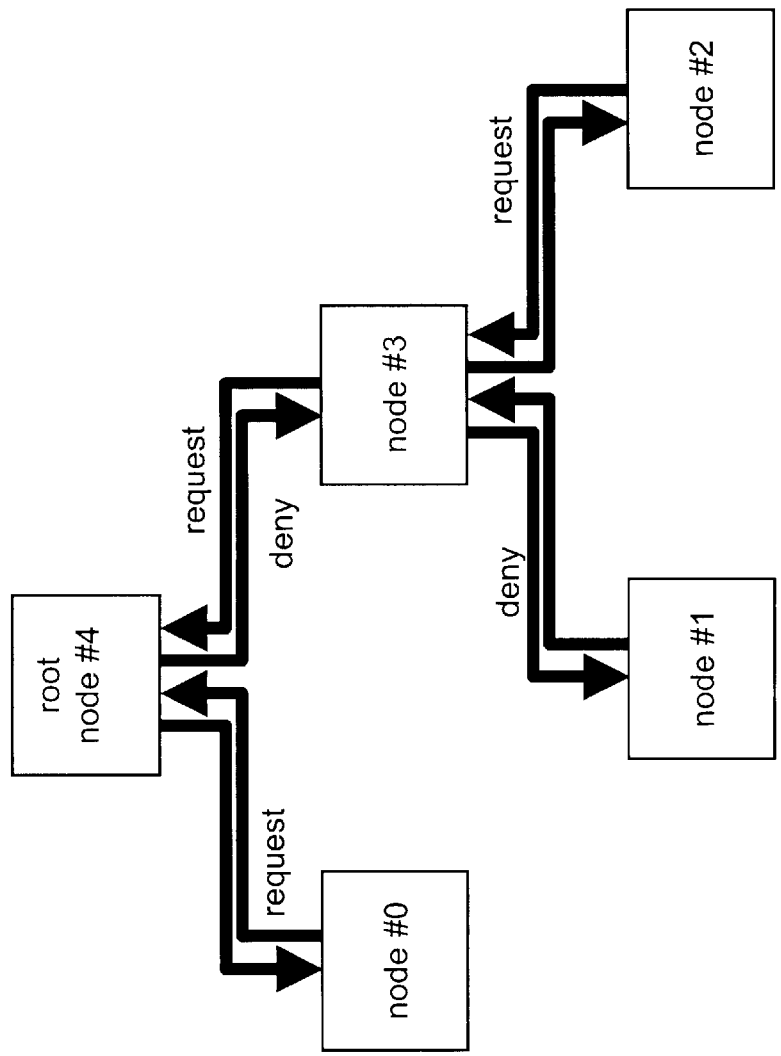
FIG. 3B is a prior art example of IEEE 1394-1995 communication between nodes during arbitration.
Figure 3C:
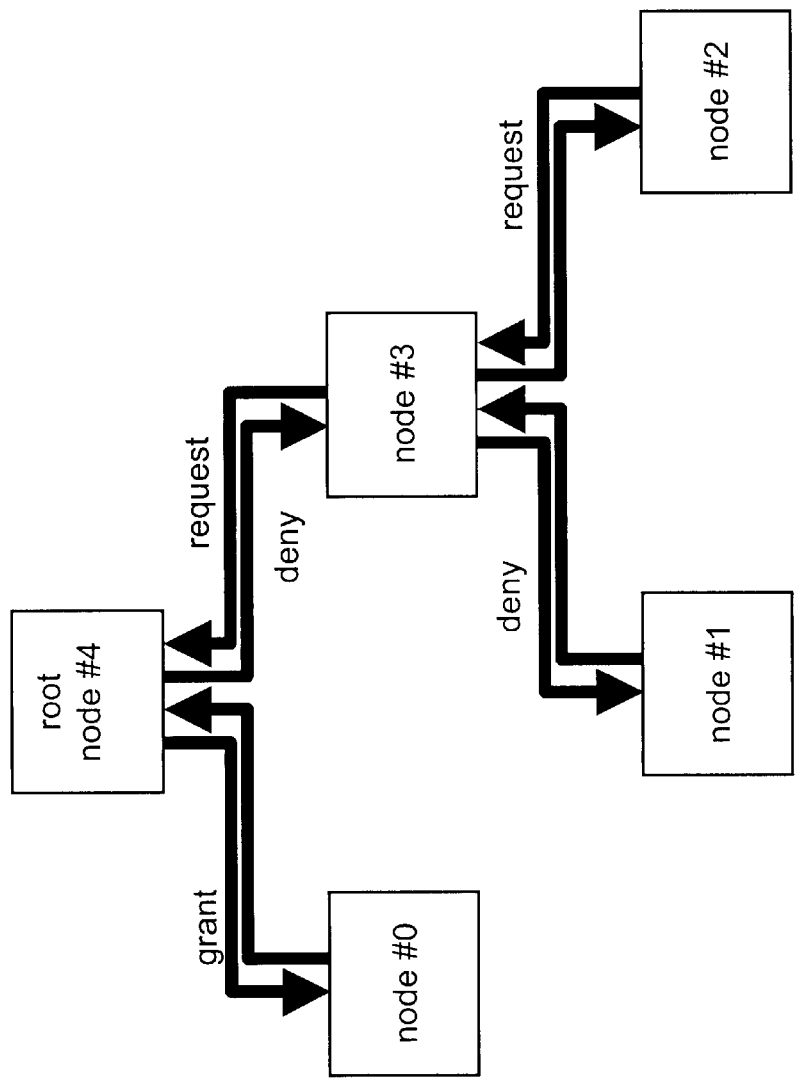
FIG. 3C is a prior art example of IEEE 1394-1995 communication between nodes during arbitration.
Figure 3D:
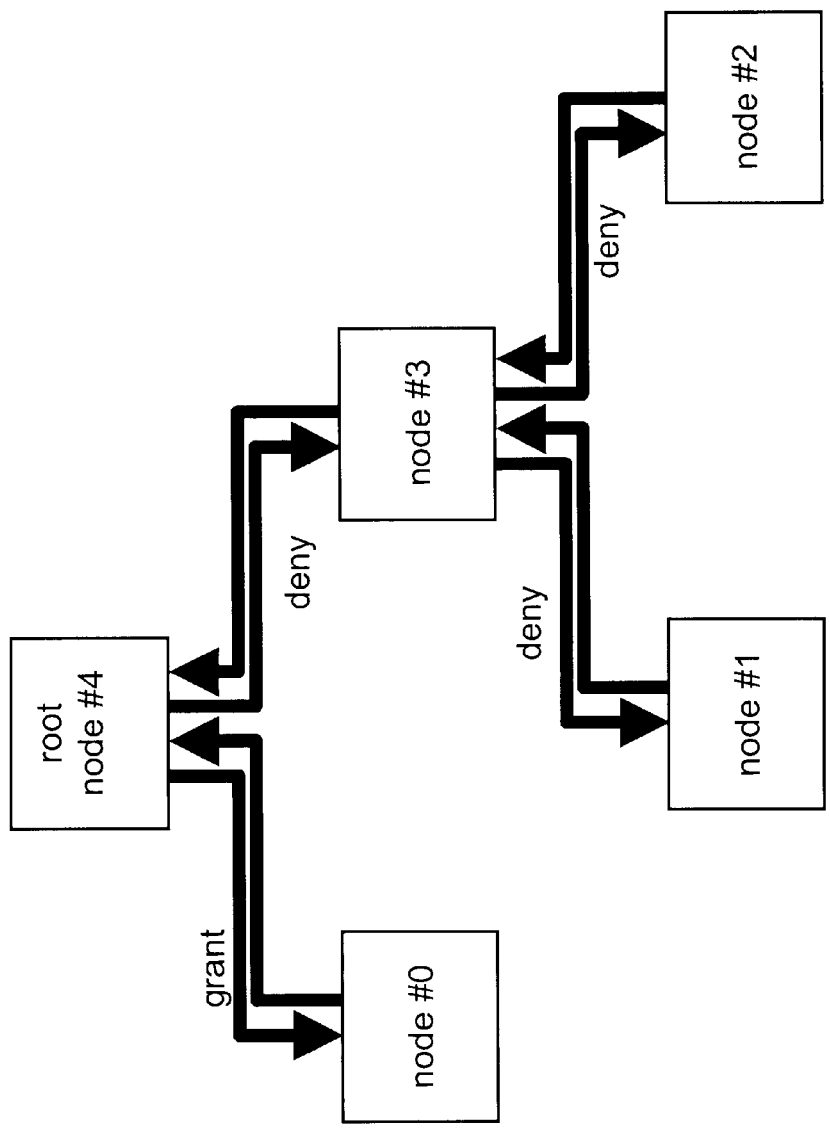
FIG. 3D is a prior art example of IEEE 1394-1995 communication between nodes during arbitration.
Figure 4:
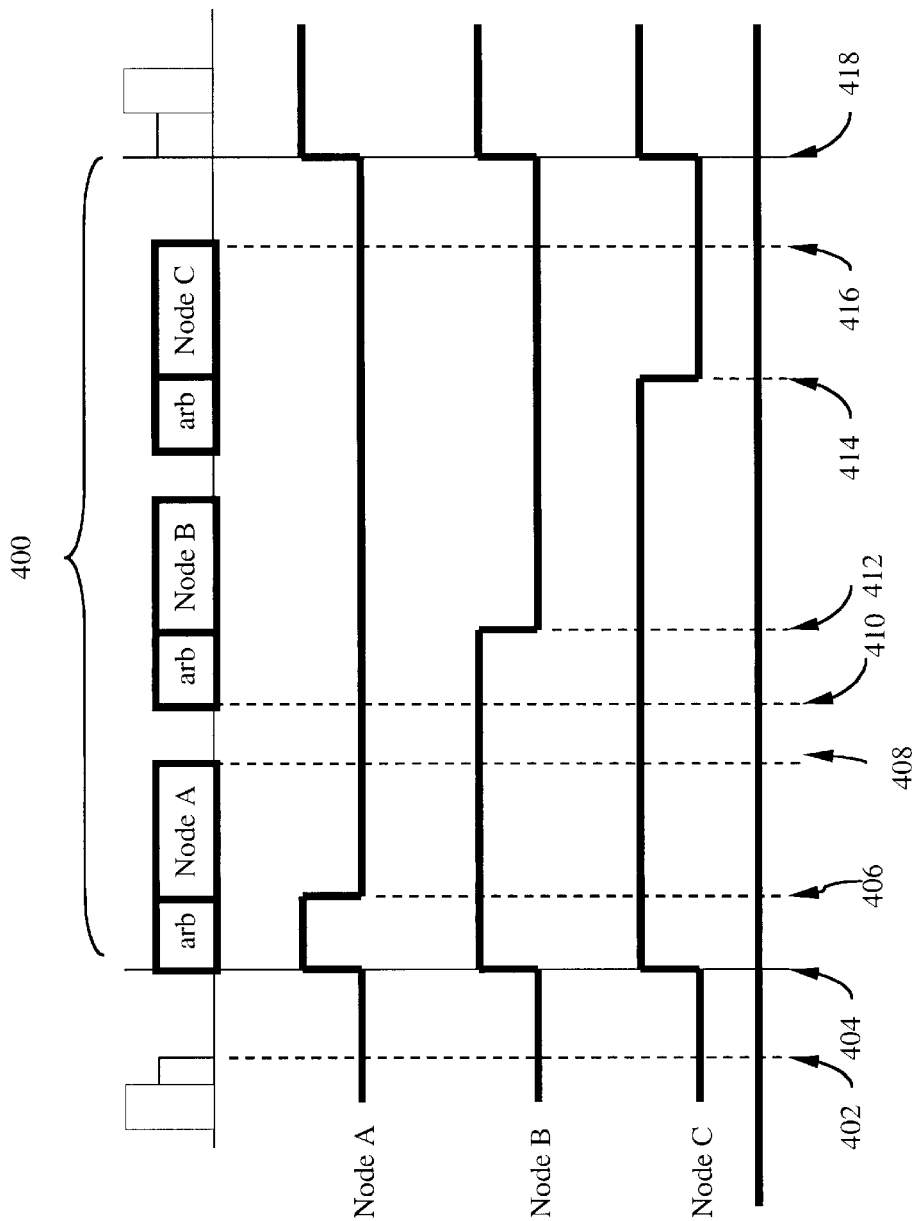
FIG. 4 is a prior art example of IEEE 1394-1995 arbitration fairness.
Figure 5:
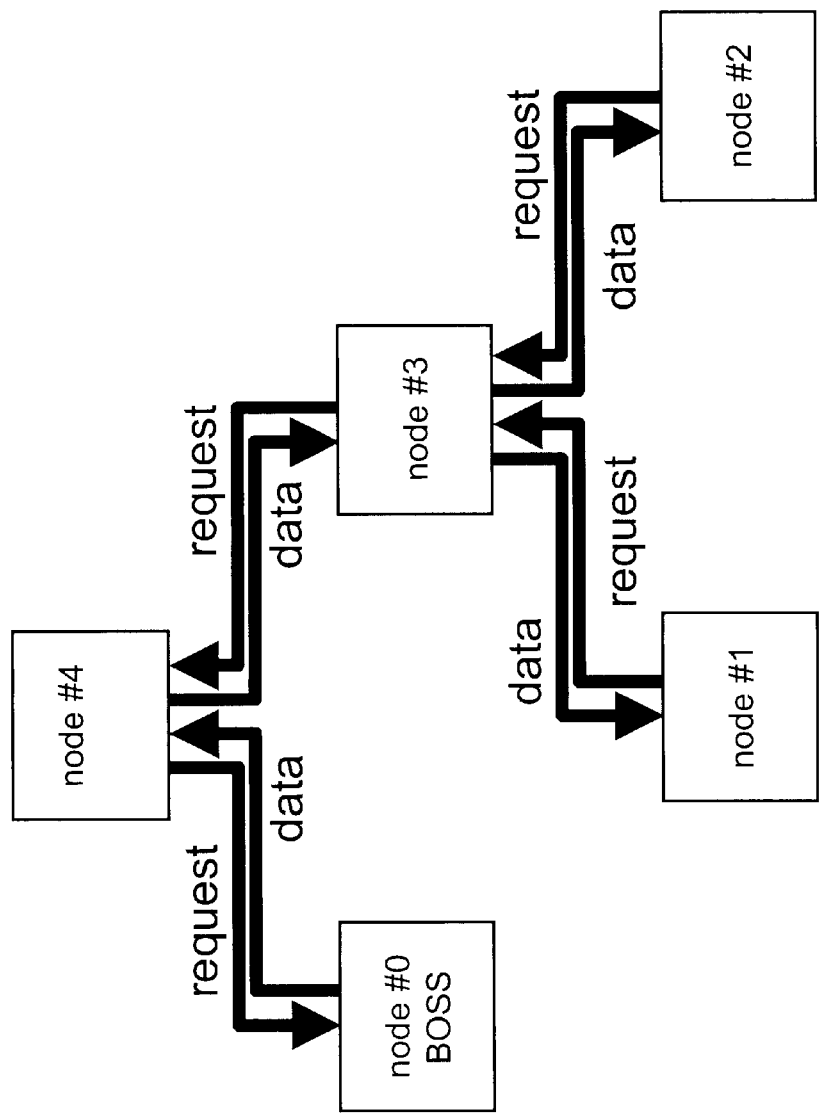
FIG. 5 is a prior art example of arbitration according to P1394b.
Figure 6:
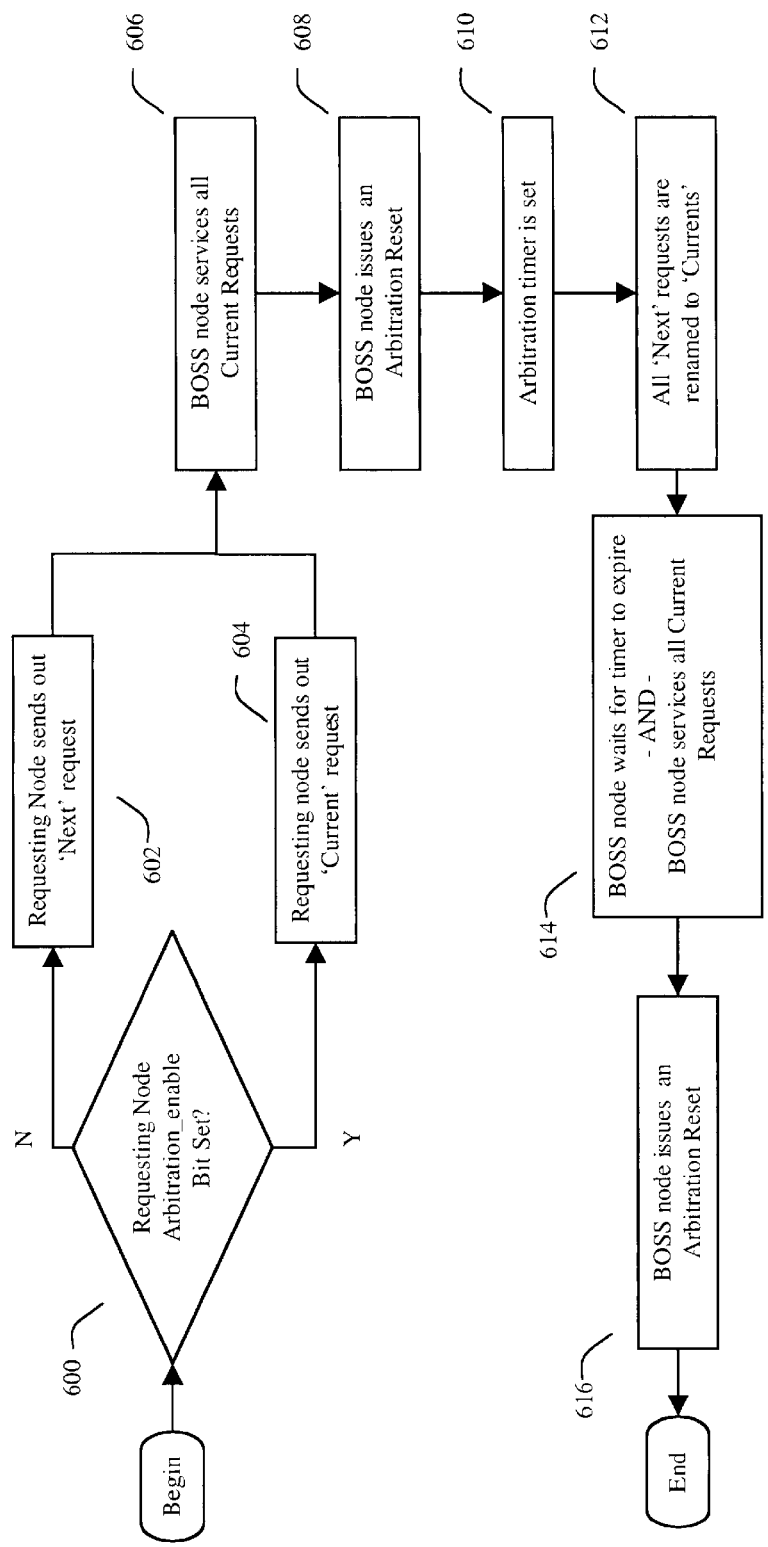
FIG. 6 is a prior art flowchart of fairness protocol according to P1394b.

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. More particularly, the present invention relates to a method and apparatus for an arbitration and fairness protocol on a serial bus. The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention relates to data structures and the transmission of such data structures. It is contemplated that the present invention may by embodied in various computer and machine readable data structure. Furthermore, it is contemplated that data structures embodying the present invention will be transmitted across computer and machine readable media.

The present invention further relates to devices that embody the P1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation were one node corresponds to one device.

Each node may communicate to other nodes in an P1394b-compatible system though links. Typically, a cable is used for a link, as is provided for in the P1394b standard. However, any communication means may be employed. By way of example, an infrared, RF, or other wireless system may be used, as well as an optical system.

Typically, a link is coupled to a node through a port. A port transmits and receives messages and data between the node and link. As is known by one skilled in the art, each node may have more than one port.

In the discussion that follows, much of the lower-level detail such as ports and links will be omitted, and the discussion will focus instead on nodes. Furthermore, the discussion will focus on nodes connected to a serial bus compatible with the P1394 standard. In accordance with the P1394b standard, a physical node is referred to as a PHY. Therefore, in the discussion that follows PHYs that are compatible with the P1394b may be referred to as PHYs.

Definitions

Tokens

The following tokens as shown in Table 1 will be used in describing the present invention.

TABLE 1

Tokens

| Token Name | Comment |
|---|---|
| Cycle_start_odd | Follows cycle start packet where the low order of the bit cycle is clear. |
| Cycle_start_even | Follows cycle start packet where the low order of the bit cycle is set. |
| Arb_reset_odd | Sent by BOSS where no current or next_even requests are received. |
| Arb_reset_even | Sent by BOSS where no current or next_odd requests are received |
| Bus_reset | Forces a bus reset. The cycle start phase is unchanged. All new nodes must wait for a cycle start phase to arrive to determine their phase. The fairness phase will set to "odd". |
| Asynch_start | Sent by BOSS if cycle start has been received, and no isochronous requests of the current phase are received. |
| Grant | Sent by BOSS to the highest priority request. |

Requests and Priorities

The following requests and associated priority levels as shown in Tables 2 and 3 will be used in describing the present invention.

TABLE 2

Asynchronous requests

| Request Name | Priority | Comment |
|---|---|---|
| Cycle_start_request | 1 (highest) | |
| Border_High | 2 | Keeps the P1394a and P1394b boundary protocol working correctly; done at a very high priority to handle 1394–1995 PHYs that have short request timeouts. |
| Next_odd | 3, if the last arbitration reset token was Arb_reset_odd, else 5 | This is a queued request from the previous fairness cycle. |
| Current | 4 | Used for all normal asynch request by nodes that have not used up their fairness budget. |
| Next_even | 5, if the last arbitration reset token was Arb_reset_even, else 3 | For queuing requests across the next fairness cycle. |
| Border_Low | 6 (lowest) | Used to keep the P1394b side of the border node from advancing to a new fairness cycle. |

TABLE 3

Isochronous requests

| Request Name | Priority | Comment |
|---|---|---|
| Isoch_odd | 1 (highest), if the last cycle_start was cycle_start_odd, else 2 | Used if the last cycle start token was cycle_start_odd and the packet is intended to transmit in the current cycle. If the last cycle start token was cycle_start_even, this request is used if the packet is intended to transmit in the next cycle. |
| Isoch_even | 2 (lowest)), if the last cycle_start was cycle_start_odd else 1 | Used if the last cycle start token was cycle_start_even and the packet is intended to transmit in the current cycle. If the last cycle start token was cycle_start_odd, this request is used if the packet is intended to transmit in the next cycle. |

Node Behavior

As mentioned above, in P1394b-compliant nodes, the node that was last transmitting is the BOSS node. In a presently preferred embodiment of the present invention, nodes, that are receiving also repeat the highest priority request to their neighbors.

Figure 7:
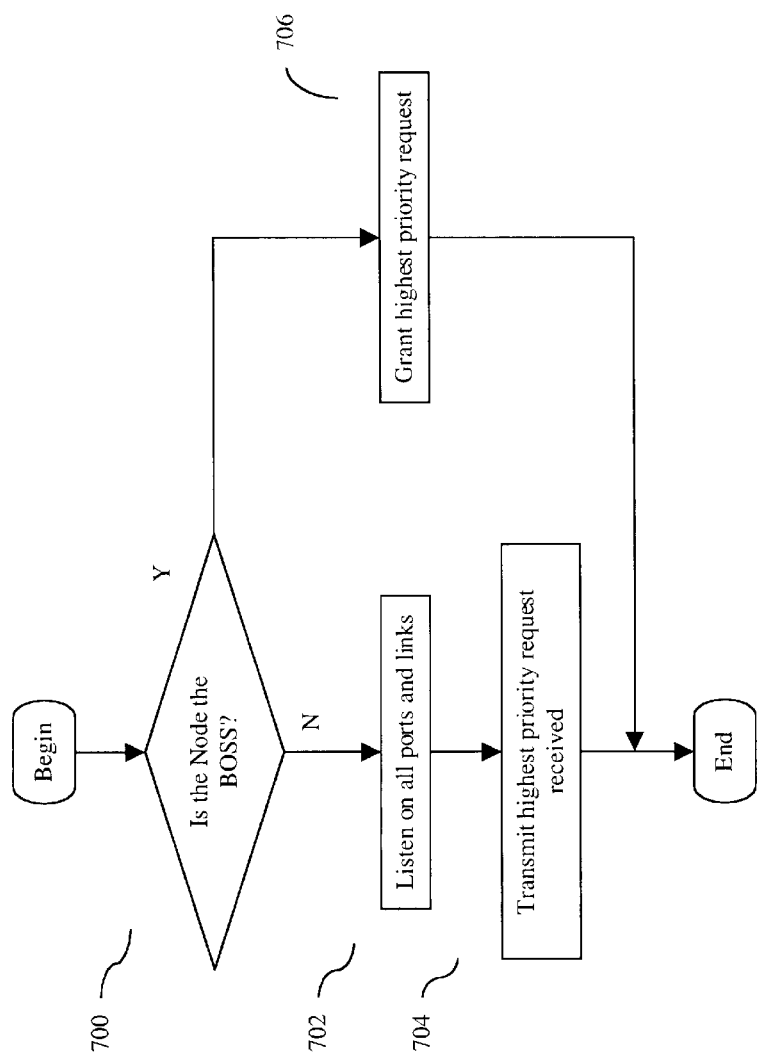
FIG. 7 is a flowchart of prior art node behavior.

FIG. 7 is a flowchart of prior art node behavior. In query 700, a determination is made whether the node BOSS or not. If the node is not BOSS, then in act 702 that node will listen on all of its ports and links. In act 704, the node will then transmit the highest priority request it receives in act 702. In one preferred embodiment, the priority of the received requests is made according to Tables 2 and 3.

If the node is BOSS, then in act 706 the BOSS will grant the highest priority request received. In one preferred embodiment, act 706 will occur at the end of a subaction gap, which can occur after transmitting an ACK packet, an isochronous packet, a PHY response packet, or a PHY packet which does not expect a PHY response packet.

As is known by one skilled in the art, P1394b supports both asynchronous and isochronous communications. Arbitration and fairness protocols for both according to the present invention will now be discussed.

Asynchronous
Node Arbitration

Figure 8:
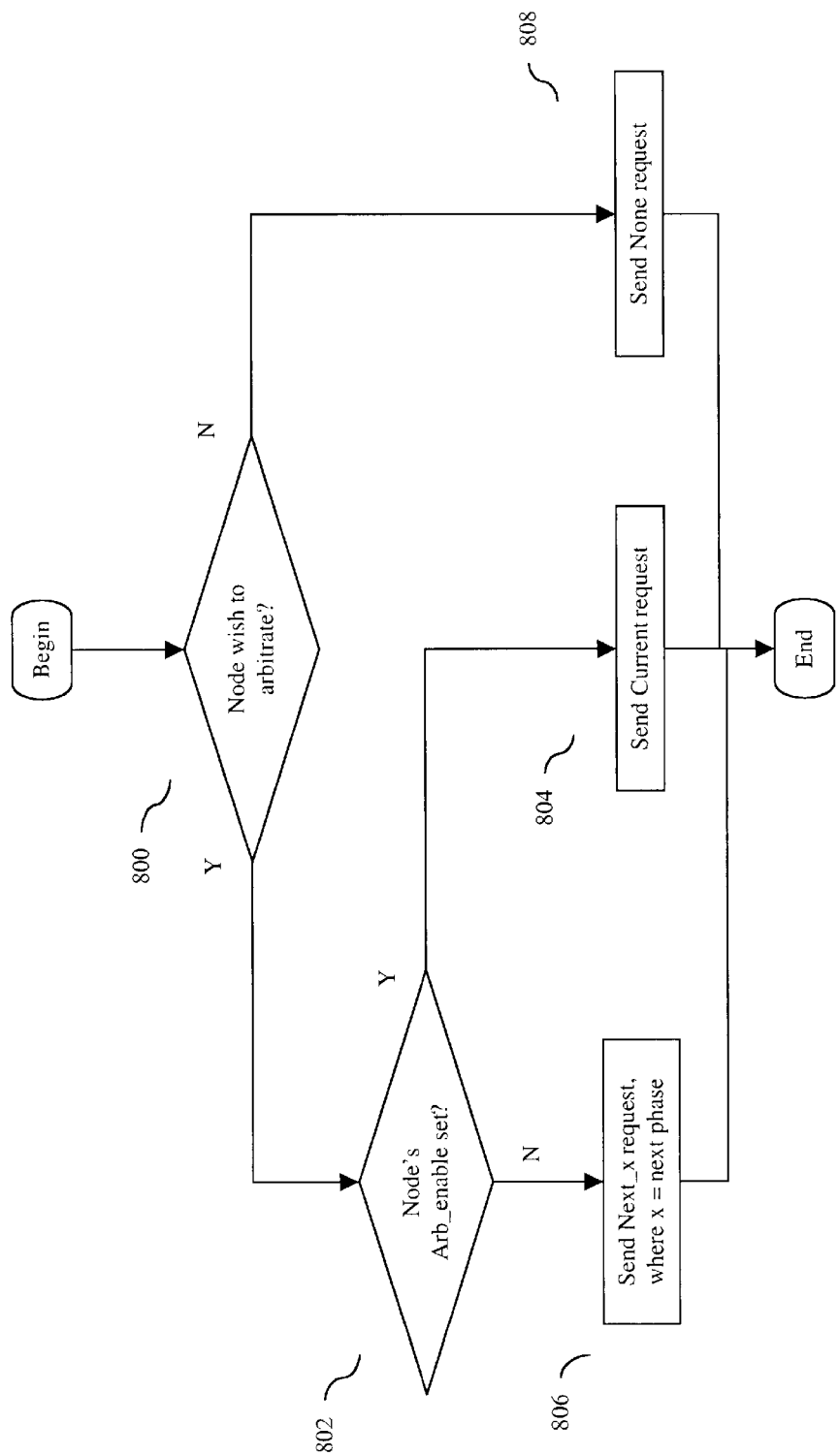
FIG. 8 is a flowchart of asynchronous arbitration according to the present invention.

FIG. 8 is a flowchart showing asynchronous node arbitration according to the present invention.

At query 800 the node determines whether or not it needs to arbitrate for the bus. If it does, the node next determines whether its Arbitration_enable flag is set in act 802. If it is, then it may issue a Current request as shown in act 804.

If the node's Arbitration_enable flag is reset, then the process moves to act 806.

Referring still to FIG. 8, act 806 is key to the present invention. Unlike the prior art described above which had a Current and Next request, one preferred embodiment of the present invention has a Current request, and then two "phases" of Next requests, referred to herein as "odd" and "even". It is contemplated that the indication for the arbitration phases will be contained within data structures that will be transmitted throughout the bus.

As will be explained shortly, the BOSS will determine an set which phase the bus is in, either odd or even. Therefore, at act 806, if the bus is in the odd phase, the node will issue a Next_even request, meaning that the node wishes to arbitrate in the next phase, which will be even. If the bus is in an even phase, then the node will issue a Next_odd request, meaning that the node would like to arbitrate in the next phase, which will be odd.

If the node does not wish to arbitrate in the current phase, then in act 808 the node will issue a None. As is appreciated by one skilled in the art, this forces a node to continuously broadcast its intentions. Furthermore, as mentioned in FIG. 7, nodes are also repeating the highest priority they receive. This constant communication has certain advantages, as will be seen shortly.

Fairness Interval

Figure 9A:
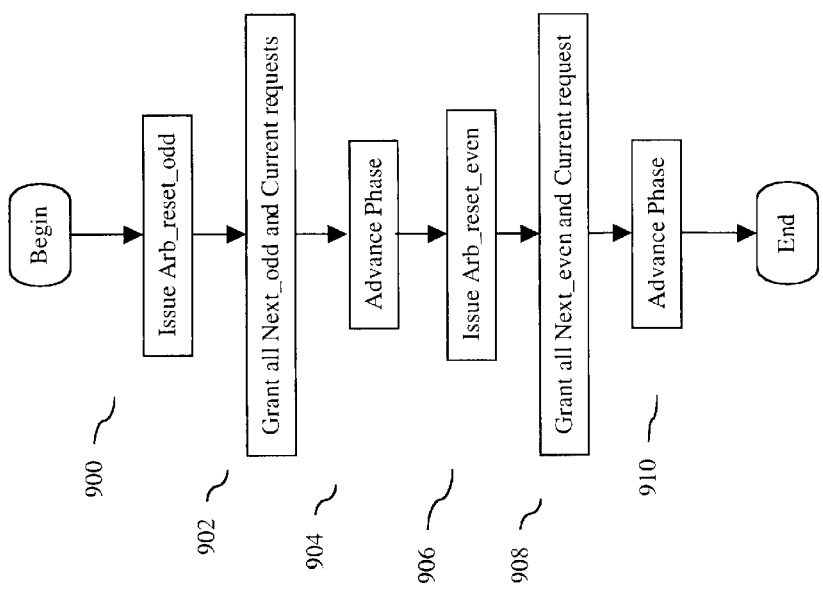
FIG. 9A is a flowchart of asynchronous fairness according to the present invention.

FIG. 9A is a flowchart of a fairness protocol according to the present invention. In this example, the BOSS will first issue a Arb_reset_odd in act 900, forcing the bus into an odd phase. The BOSS will then grant all Next_odd requests that have been queued up as well as any new or active Current requests in act 902.

Referring still to FIG. 9A, the phase of the arbitration interval will be advanced in act 904. As is appreciated by one normally skilled in the art, this advancing may take place by any means. By way of non-limiting example, such means may include a timer, or enabling the BOSS node to advance the fairness interval by allowing the BOSS node to determine when advancement is proper.

The process repeats again for the even phase. The BOSS will issue a Arb_reset_even to the bus in act 906. In act 908, the BOSS will then grant all Next_even request queued up on the bus as well as any new or active Current requests.

Finally, the phase of the arbitration interval will be advanced in act 910.

As is appreciated by persons of ordinary skill in the art, the process shown and described in FIG. 9A may be repeated as often as necessary.

Figure 9B:
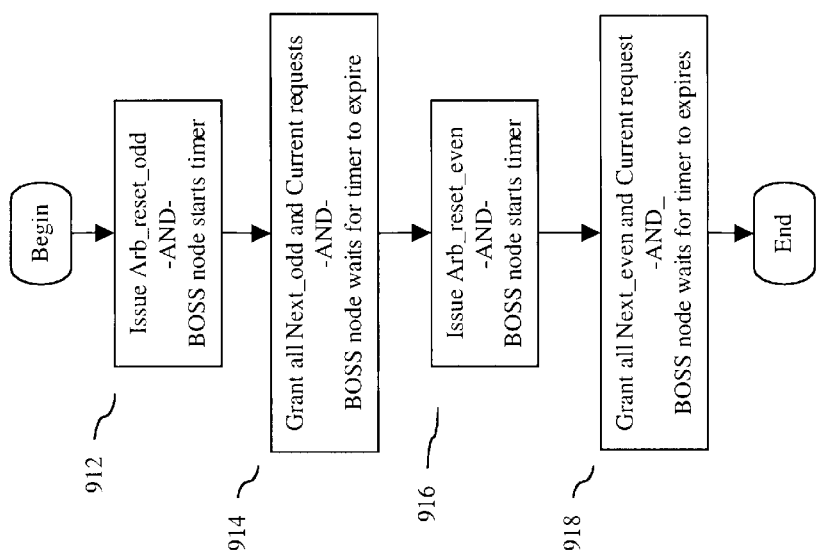
FIG. 9B is a flowchart of asynchronous fairness according to the present invention.

FIG. 9B is a flowchart of a fairness protocol for BOSS nodes according to the present invention in which timers are used. In this example, the BOSS will first issue a Arb_reset_odd in act 912, forcing the bus into an odd phase and will start a timer set to expire at the worst case round-trip time on the bus.

The BOSS will then grant all Next_odd requests that have been queued up as well as any new or active Current requests in act 914. As mentioned earlier, these Next_odd requests were issued by nodes which were not able to arbitrate in the previous even phase because their Arbitration_enable flag was reset, meaning that they had used up their arbitration budget.

Referring still to FIG. 9B, if there are no more Next_odd or Current requests to grant and the timer has expired, then the BOSS will issue a Arb_reset_even to the bus in act 916 and start a timer as in act 900.

In act 918, the BOSS will then grant all Next_even request queued up on the bus as well as any new or active Current requests. As is appreciated by one skilled in the art, these requests were generated during the time acts 900–902 were being performed by nodes that had used up their fairness budget.

As is appreciated by one skilled in the art, the protocol described in FIG. 9B eliminates the need to rename Next requests to Current as was necessary in the prior art.

Isochronous
Node Arbitration

The isochronous embodiment of the present invention is similar to the asynchronous version, except that there is no Current request.

Figure 10:
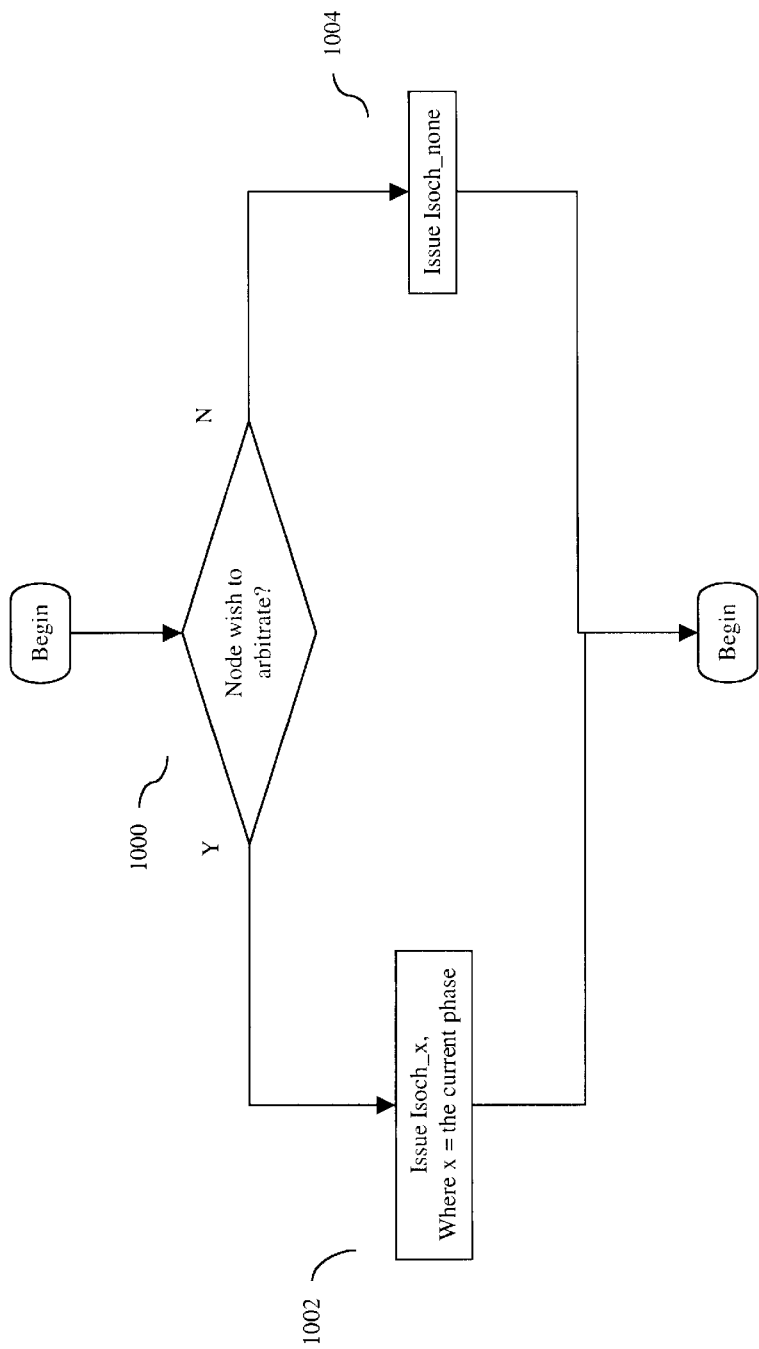
FIG. 10 is a flowchart of isochronous arbitration according to the present invention.

FIG. 10 is a flowchart of an isochronous embodiment of the present invention. In query 1000, the node determines whether it wishes to arbitrate in the next phase. If it does, it issues a request in act 1000 according to the present phase of the bus. The node will issue a Isoch_x request, where x=to the next state. For example, if the current phase is odd, then the node will issue an Isoch_even request, and visa-versa for the even phase.

If the node does not wish to arbitrate for the next phase, then the node will issue an Isoch_none request in act 1000.

Isochronous/Asynchronous Systems

It is contemplated in the present invention that systems will use both isochronous and asynchronous protocols. In a preferred embodiment of the present invention, nodes can issue both isochronous and asynchronous requests. In such a system, isochronous requests will take priority over asynchronous requests during special intervals called the "isochronous phase". During this time, a BOSS will service only isochronous requests, then service asynchronous requests after all isochronous requests have been serviced.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a full-duplex communications system having a plurality of nodes sending arbitration requests to a BOSS node, a method for providing an arbitration fairness protocol comprising the acts of:

providing an first arbitration phase, a second arbitration phase, and an arbitration advancing means;

sending an arbitration reset command for the first arbitration phase by the BOSS node;

granting arbitration by the BOSS node of arbitration requests made by the plurality of nodes for said first arbitration phase during said second arbitration phase;

granting arbitration by the BOSS node of arbitration requests made by the plurality of nodes for said first arbitration phase during said first arbitration phase;

advancing to said second arbitration phase according to said advancing means;

sending an arbitration reset command for said second arbitration phase by the BOSS node;

granting arbitration by the BOSS node of arbitration requests made by the plurality of nodes for said second arbitration phase during said first arbitration phase; and granting arbitration by the BOSS node of arbitration requests made by the plurality of nodes for said second arbitration phase during said second arbitration phase.

2. The method of claim 1, wherein said advancing means includes a timer.

3. The method of claim 1, wherein said advancing means is accomplished by the BOSS node.

4. The method of claim 1, wherein said first arbitration phase is an odd arbitration phase.

5. The method of claim 1, wherein said second arbitration phase is an even arbitration phase.

6. The method of claim 1, comprising the additional act of repeating said arbitration fairness protocol as often as the BOSS node deems necessary.

7. In a full-duplex communications system having a plurality of nodes communicating in an asynchronous manner, each of the nodes having an arbitration indicator therein, a method for providing access to arbitration comprising the acts of:

providing a current arbitration phase and an inactive arbitration phase;

determining whether one of said plurality of nodes wishes to arbitrate on the full-duplex communications system;

if one of said nodes wishes to arbitrate, determining further whether the arbitration indicator within said node is set;

sending an arbitration request on said full-duplex communications system for the active arbitration phase by said node if said arbitration indicator is set;

sending an arbitration request on said full-duplex communications system for the inactive arbitration phase by said node if said arbitration indicator is reset; and sending an arbitration denial for said current arbitration phase if said node does not wish to arbitrate.

8. The method of claim 7, wherein said current arbitration phase is an odd arbitration phase, and said inactive arbitration phase is an even arbitration phase.

9. The method of claim 7, wherein said arbitration indicator is an arbitration enable flag as provided for in the P1394b standard.

10. In a full-duplex communications system having a plurality of nodes communicating in an isochronous manner, a method for providing access to arbitration comprising the acts of:

providing a current arbitration phase and an inactive arbitration phase;

determining whether one of said plurality of nodes wishes to arbitrate on the full-duplex communications system;

if one of said nodes wishes to arbitrate, sending an arbitration request on said full-duplex communications system for the active arbitration phase by said node if said arbitration indicator is set; and sending an arbitration denial request on said full-duplex communications system for said current arbitration phase if said node does not wish to arbitrate.

11. The method of claim 10, wherein said current arbitration phase is an odd arbitration phase, and said inactive arbitration phase is an even arbitration phase.

12. The method of claim 10, wherein said arbitration indicator is an arbitration enable flag as provided for in the P1394b standard.

13. A full-duplex communications system for providing an arbitration fairness protocol to a plurality of nodes sending arbitration requests to a BOSS node, comprising:

means for providing an first arbitration phase, a second arbitration phase, and an arbitration advancing means;

means for sending an arbitration reset command for the first arbitration phase by the BOSS node;

means for granting arbitration by the BOSS node of arbitration requests made by the plurality of nodes for said first arbitration phase during said second arbitration phase;

means for granting arbitration by the BOSS node of arbitration requests made by the plurality of nodes for said first arbitration phase during said first arbitration phase;

means for advancing to said second arbitration phase according to said advancing means;

means for sending an arbitration reset command for said second arbitration phase by the BOSS node;

means for granting arbitration by the BOSS node of arbitration requests made by the plurality of nodes for said second arbitration phase during said first arbitration phase; and means for granting arbitration by the BOSS node of arbitration requests made by the plurality of nodes for said second arbitration phase during said second arbitration phase.

14. The system of claim 13, wherein said advancing means includes a timer.

15. The system of claim 13, wherein said advancing means is accomplished by the BOSS node.

16. The system of claim 13, wherein said first arbitration phase is an odd arbitration phase.

17. The system of claim 13, wherein said second arbitration phase is an even arbitration phase.

18. The system of claim 13, further comprising repeating means for repeating said arbitration fairness protocol as often as the BOSS node deems necessary.

19. A full-duplex communications system for providing access to arbitration and having a plurality of nodes communicating in an asynchronous manner, each of the nodes having an arbitration indicator therein, the system comprising:

means for providing a current arbitration phase and an inactive arbitration phase;

means for determining whether one of said plurality of nodes wishes to arbitrate on the full-duplex communications system;

means for further determining whether the arbitration indicator within said node is set if one of said nodes wishes to arbitrate;

means for sending an arbitration request on said full-duplex communications system for the active arbitration phase by said node if said arbitration indicator is set;

means for sending an arbitration request on said full-duplex communications system for the inactive arbitration phase by said node if said arbitration indicator is reset; and means for sending an arbitration denial for said current arbitration phase if said node does not wish to arbitrate.

20. The system of claim 19, wherein said current arbitration phase is an odd arbitration phase, and said inactive arbitration phase is an even arbitration phase.

21. The system of claim 19, wherein said arbitration indicator is an arbitration enable flag as provided for in the P1394b standard.

22. A full-duplex communications system for providing access to arbitration and having a plurality of nodes communicating in an isochronous manner, the system comprising:
- means for providing a current arbitration phase and an inactive arbitration phase;
- means for determining whether one of said plurality of nodes wishes to arbitrate on the full-duplex communications system;
- means for sending an arbitration request on said full-duplex communications system for the active arbitration phase by said node if said arbitration indicator is set, if one of said nodes wishes to arbitrate; and
- means for sending an arbitration denial request on said full-duplex communications system for said current arbitration phase if said node does not wish to arbitrate.

23. The system of claim 22, wherein said current arbitration phase is an odd arbitration phase, and said inactive arbitration phase is an even arbitration phase.

24. The system of claim 22, wherein said arbitration indicator is an arbitration enable flag as provided for in the P1394b standard.

25. A program storage device readable by a machine, tangibly embodying a program of instructions executable by a machine for providing an arbitration fairness protocol to a plurality of nodes sending arbitration requests to a BOSS node, comprising:
- means for providing an first arbitration phase, a second arbitration phase, and an arbitration advancing means;
- means for sending an arbitration reset command for the first arbitration phase by the BOSS node;
- means for granting arbitration by the BOSS node of arbitration requests made by the plurality of nodes for said first arbitration phase during said second arbitration phase;
- means for granting arbitration by the BOSS node of arbitration requests made by the plurality of nodes for said first arbitration phase during said first arbitration phase;
- means for advancing to said second arbitration phase according to said advancing means;
- means for sending an arbitration reset command for said second arbitration phase by the BOSS node;
- means for granting arbitration by the BOSS node of arbitration requests made by the plurality of nodes for said second arbitration phase during said first arbitration phase; and
- means for granting arbitration by the BOSS node of arbitration requests made by the plurality of nodes for said second arbitration phase during said second arbitration phase.

26. The system of claim 25, wherein said advancing means includes a timer.

27. The system of claim 25, wherein said advancing means is accomplished by the BOSS node.

28. The system of claim 25, wherein said first arbitration phase is an odd arbitration phase.

29. The system of claim 25, wherein said second arbitration phase is an even arbitration phase.

30. The system of claim 25, further comprising repeating means for repeating said arbitration fairness protocol as often as the BOSS node deems necessary.

31. A program storage device readable by a machine, tangibly embodying a program of instructions executable by a machine for providing access to arbitration and having a plurality of nodes communicating in an asynchronous manner, each of the nodes having an arbitration indicator therein, the system comprising:
- means for providing a current arbitration phase and an inactive arbitration phase;
- means for determining whether one of said plurality of nodes wishes to arbitrate on the full-duplex communications system;
- means for further determining whether the arbitration indicator within said node is set if one of said nodes wishes to arbitrate;
- means for sending an arbitration request on said full-duplex communications system for the active arbitration phase by said node if said arbitration indicator is set;
- means for sending an arbitration request on said full-duplex communications system for the inactive arbitration phase by said node if said arbitration indicator is reset; and
- means for sending an arbitration denial for said current arbitration phase if said node does not wish to arbitrate.

32. The system of claim 31, wherein said current arbitration phase is an odd arbitration phase, and said inactive arbitration phase is an even arbitration phase.

33. The system of claim 31, wherein said arbitration indicator is an arbitration enable flag as provided for in the P1394b standard.

34. A program storage device readable by a machine, tangibly embodying a program of instructions executable by a machine for providing access to arbitration and having a plurality of nodes communicating in an isochronous manner, the system comprising:
- means for providing a current arbitration phase and an inactive arbitration phase,
- means for determining whether one of said plurality of nodes wishes to arbitrate on the full-duplex communications system;
- means for sending an arbitration request on said full-duplex communications system for the active arbitration phase by said node if said arbitration indicator is set, if one of said nodes wishes to arbitrate; and
- means for sending an arbitration denial request on said full-duplex communications system for said current arbitration phase if said node does not wish to arbitrate.

35. The system of claim 34, wherein said current arbitration phase is an odd arbitration phase, and said inactive arbitration phase is an even arbitration phase.

36. The system of claim 34, wherein said arbitration indicator is an arbitration enable flag as provided for in the P1394b standard.

* * * * *